(12) United States Patent
Benisty et al.

(10) Patent No.: US 11,966,613 B2
(45) Date of Patent: Apr. 23, 2024

(54) SELECTIVE DEVICE POWER STATE RECOVERY METHOD

(71) Applicant: Western Digital Technologies, Inc., San Jose, CA (US)

(72) Inventors: Shay Benisty, Beer Sheva (IL); Nissim Elmaleh, Meitar (IL)

(73) Assignee: Western Digital Technologies, Inc., San Jose, CA (US)

( * ) Notice: Subject to any disclaimer, the term of this patent is extended or adjusted under 35 U.S.C. 154(b) by 42 days.

(21) Appl. No.: 17/456,443

(22) Filed: Nov. 24, 2021

(65) Prior Publication Data
US 2023/0161494 A1   May 25, 2023

(51) Int. Cl.
*G06F 3/06*    (2006.01)
*G06F 1/3234*  (2019.01)

(52) U.S. Cl.
CPC .......... *G06F 3/0647* (2013.01); *G06F 1/3275* (2013.01); *G06F 3/0619* (2013.01); *G06F 3/0634* (2013.01); *G06F 3/0679* (2013.01)

(58) Field of Classification Search
CPC .... G06F 3/0647; G06F 3/0619; G06F 3/0634; G06F 3/0679; G06F 1/3275
See application file for complete search history.

(56) References Cited

U.S. PATENT DOCUMENTS

| | | | |
|---|---|---|---|
| 9,990,365 B1* | 6/2018 | Kilpatrick | G06F 16/168 |
| 10,296,249 B2 | 5/2019 | Benisty | |
| 10,725,677 B2 | 7/2020 | Shechter et al. | |
| 2004/0073761 A1* | 4/2004 | Kato | G06F 9/4403 713/1 |
| 2005/0283648 A1* | 12/2005 | Ashmore | G06F 1/3203 714/E11.138 |
| 2007/0154228 A1* | 7/2007 | Chan | G03G 15/0865 399/12 |
| 2013/0166866 A1* | 6/2013 | Yerushalmi | G06F 1/3275 711/E12.001 |

(Continued)

FOREIGN PATENT DOCUMENTS

| | | |
|---|---|---|
| CN | 111913836 A | 11/2020 |
| CN | 112579005 A | 3/2021 |

OTHER PUBLICATIONS

International Search Report and Written Opinion for International Application No. PCT/US2022/029389 dated Sep. 13, 2022.

*Primary Examiner* — Nanci N Wong
(74) *Attorney, Agent, or Firm* — PATTERSON + SHERIDAN, LLP

(57) ABSTRACT

The present disclosure generally relates to reducing exit latency when transitioning from non-operational power states. Before entering a non-operational power state, specific data in databases and/or tables can be identified as being recently utilized by the host device. In addition to saving the databases and/or tables, a recovery code is also stored to identify that specific data. Upon transitioning back to an operational power state, the recovery code is detected and the specific data can be recovered rather than recovering the entire database and/or table. Data not identified in the recovery code need not be recovered from always-on memory. In so doing, when transitioning back to an operational power state, the latency will be reduced compared to a situation where all data is stored in always-on memory.

20 Claims, 7 Drawing Sheets

(56) References Cited

U.S. PATENT DOCUMENTS

| | | | |
|---|---|---|---|
| 2015/0261289 A1 | 9/2015 | Burke et al. | |
| 2015/0331624 A1* | 11/2015 | Law | G06F 3/065 |
| | | | 711/103 |
| 2016/0216751 A1* | 7/2016 | Kim | G06F 1/3206 |
| 2017/0003981 A1* | 1/2017 | Erez | G06F 3/0685 |
| 2019/0237124 A1 | 8/2019 | Cha | |
| 2019/0369913 A1* | 12/2019 | Hahn | G06F 3/0619 |
| 2020/0333870 A1 | 10/2020 | Vaysman et al. | |
| 2021/0018975 A1 | 1/2021 | Liang et al. | |
| 2021/0064257 A1 | 3/2021 | Cariello | |

* cited by examiner

| NVME Power State | Device Power State | Entry Latency | Exit Latency | Power |
|---|---|---|---|---|
| PS0 | DPS0 | 10 nSec | <10 nSec | 100%, ~ 3.5W @512GB |
| PS1 | DPS0.1 | 10 nSec | <10 nSec | 75% |
| PS2 | DPS0.2 | 10 nSec | <10 nSec | 50% |
| Active-Idle | Active-Idle | NA | <1uSEC | 600mW |
| Thermal-Idle | DPS1 | NA | <500uSec | 1.3W |
| PS3 | DPS2 | ~1.5 ms | <10 mSec (3.5ms) | <50 mW |
| PS4 | DPS3.1 | ~2 ms | <20 mSec (5ms) | <5 mW |
| PS5 | DPS3.2 | ~3.5 ms | <20 mSec (28ms) | <3 mW |
| Power down | Cold Boot time: up to 100 mSec | | | |

PS0–Thermal-Idle: Operational mode
PS3–PS5: Non-operational node

FIG. 3

| Byte Offset | 31 30 29 28 27 26 25 24 23 22 21 20 19 18 17 16 15 14 13 12 11 10 9 8 7 6 5 4 3 2 1 0 |
|---|---|
| +000h | Entry 0: Message Address |
| +004h | Entry 0: Message Upper Address |
| +008h | Entry 0: Message Data |
| +00Ch | Entry 0: Vector Control |
| +010h | Entry 1: Message Address |
| +014h | Entry 1: Message Upper Address |
| +018h | Entry 1: Message Data |
| +01Ch | Entry 1: Vector Control |

SELECTIVE DEVICE POWER STATE RECOVERY METHOD

BACKGROUND OF THE DISCLOSURE

Field of the Disclosure

Embodiments of the present disclosure generally relate to reducing exit time latency when transitioning from non-operational power states.

Description of the Related Art

Power measurements for non-volatile memory express (NVMe) power states play a critical role for solid state drive (SSD) consumers in the client world of storage systems in terms of battery life. The same is managed using NVMe power states and is a key quality exit criterion. Achieving power measurement with high accuracy, at entry and exit of a power state, is critical.

One of the power states utilized is L0, which is when the data storage device is operating normally. L1 is a link state where no data is transferred so that key portions of the PCIe transceiver logic can be turned off. L3 is a power state when the data storage device is powered off. L2 is a link state identical to L3, but in which power has not yet been removed. L0s is a link state where data may be being transferred in one direction but not in the other so that the two devices on a link can each independently idle their respective transmitter.

As the industry has evolved to more battery-powered devices such as mobile phones and other handheld/mobile devices that need to power on quickly, the focus of power management shifted from gross on vs. off to finer grained, moment by moment switching. L2 resume latencies were too high to allow for the use of L2 for the rapid and frequent power state switching. L1, on the other hand, power savings are too low to meet the device power consumption goals.

An innovative solution to the conundrum is in the form of L1 sub-states that use something other than the high-speed logic inside of the PCIe transceivers to wake the devices. The goal is to achieve near zero power consumption with an active state, but nonetheless, there is a long exit latency before a host is able to send commands to the data storage device.

Therefore, there is a need in the art for reducing exit latency when transitioning from non-operational power states.

SUMMARY OF THE DISCLOSURE

The present disclosure generally relates to reducing exit latency when transitioning from non-operational power states. Before entering a non-operational power state, specific data in databases and/or tables can be identified as being recently utilized by the host device. In addition to saving the databases and/or tables, a recovery code is also stored to identify that specific data. Upon transitioning back to an operational power state, the recovery code is detected and the specific data can be recovered rather than recovering the entire database and/or table. Data not identified in the recovery code need not be recovered from always-on memory. In so doing, when transitioning back to an operational power state, the latency will be reduced compared to a situation where all data is stored in always-on memory.

In one embodiment, a data storage device comprises: a memory device; and a controller coupled to the memory device, wherein the controller is configured to: receive a power transition request to transition the data storage device from a first power state to a second power state, wherein the second power state is a lower power state than the first power state, wherein at a time the request is received, data is stored in volatile memory; store at least a portion of the data in always-on memory in response to receiving the power transition request; generate and store a recovery code, wherein the recovery code indicates the portions of the data to be recovered; and transition the data storage device to the second power state.

In another embodiment, a data storage device comprises: a memory device; and a controller coupled to the memory device, wherein the controller is configured to: receive a power transition request to transition the data storage device from a first power state to a second power state, wherein the second power state is a higher power state than the first power state; retrieve data stored in always-on memory, wherein the data stored in always-on memory is less than all data present in volatile memory prior to the data storage device entering the first power state; and transition the data storage device to the second power state.

In another embodiment, a data storage device comprises: memory means; and a controller coupled to the memory means, wherein the controller is configured to: create, store, and read a recovery code, wherein the recovery code indicates that less than all data present in volatile memory when the data storage device is in an operational power state is stored in always-on memory when the data storage device is in a non-operational power state.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 is table illustrating typical power state numbers according to one embodiment.

FIG. 5 is a schematic illustration of a MSI-X table structure according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to reducing exit latency when transitioning from non-operational power states. Before entering a non-operational power state, specific data in databases and/or tables can be identified as being recently utilized by the host device. In addition to saving the databases and/or tables, a recovery code is also stored to identify that specific data. Upon transitioning back to an operational power state, the recovery code is detected and the specific data can be recovered rather than recovering the entire database and/or table. Data not identified in the recovery code need not be recovered from always-on memory. In so doing, when transitioning back to an operational power state, the latency will be reduced compared to a situation where all data is stored in always-on memory.

Figure 1:
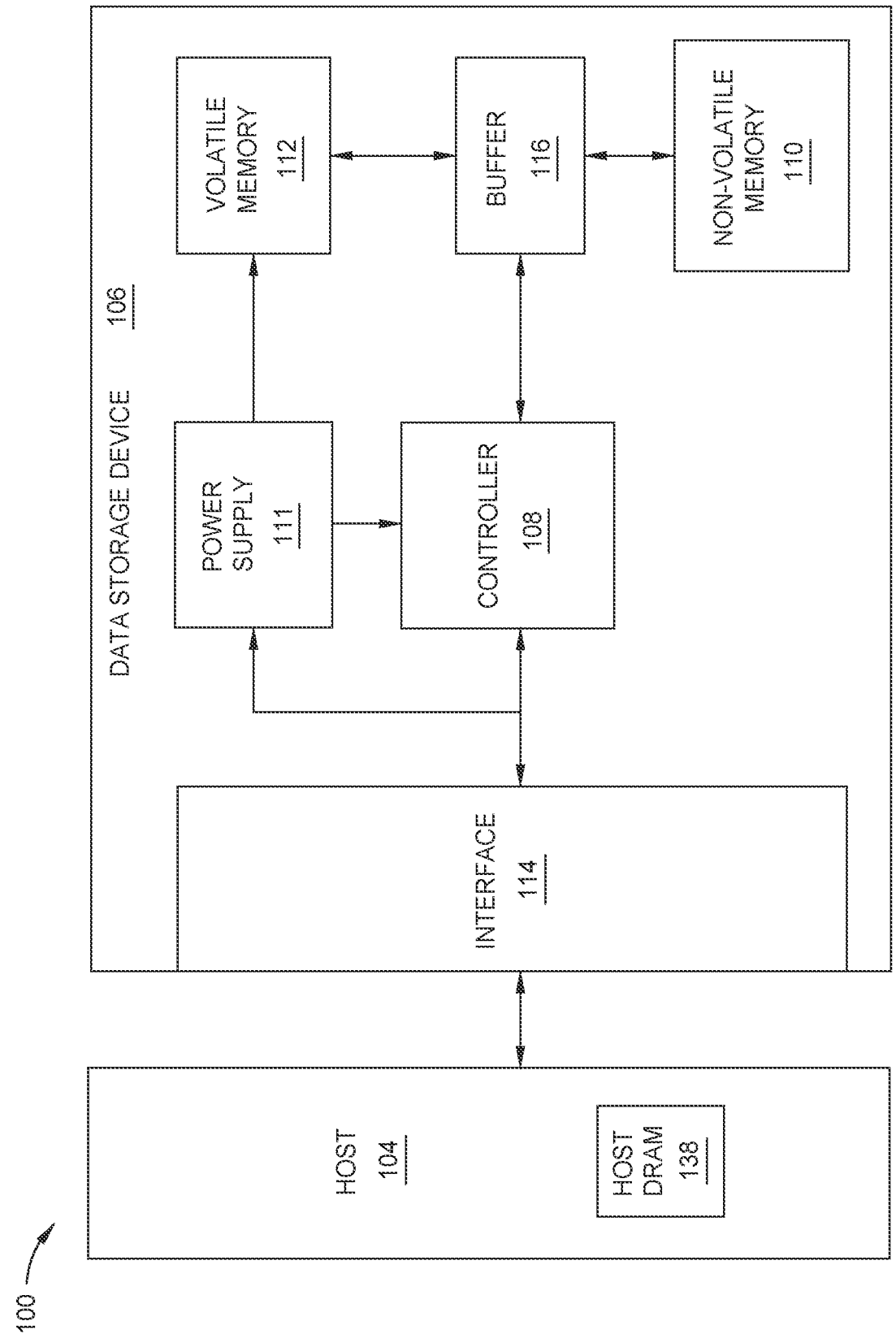
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
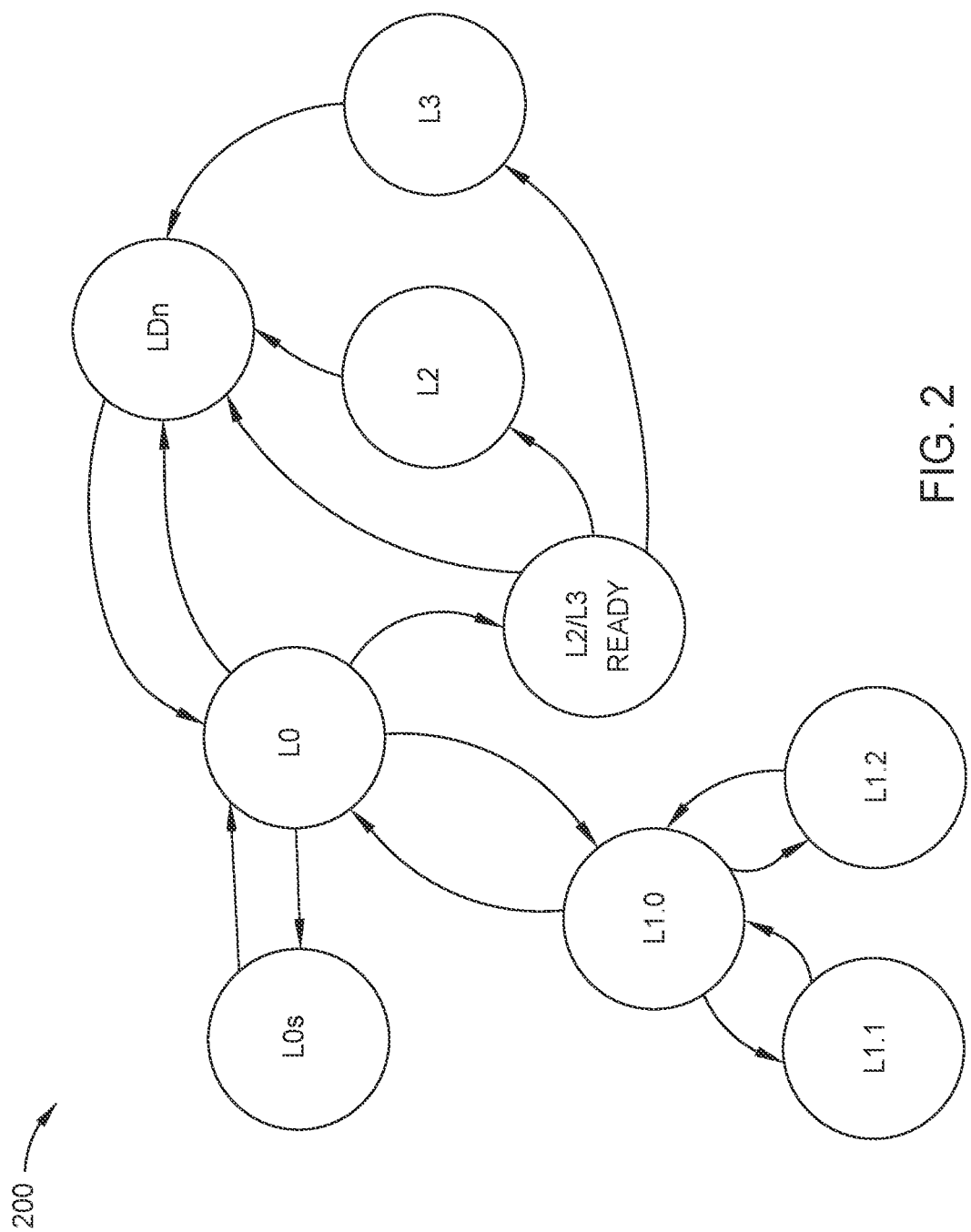
FIG. 2 is an illustration of a link power management flow diagram, according to certain embodiments.

FIG. 2 is an illustration of a link state flow diagram 200, according to certain embodiments. Aspects of the storage system 100 may be referenced in the description herein for exemplary purposes. The data storage device 106 includes several link states. For example, the data storage device 106 may have the following 5 link states: L0, L0s, L1, L2, and L3, where L1 includes a L1.1 sub-state and a L1.2 sub-state. Each of the link states are associated with a distinct operation of the data storage device 106. Link states L0, L0s, and L1 are considered operational link states and utilize a first range of power, whereas link states L2 and L3 are considered non-operational link states, utilizing a second range of power, where the first range of power is greater than the second range of power.

An operational link state refers to the ability of the host device 104 to communicate with the NVM 110 of the data storage device 106. A non-operational link state refers to the inability of the host device 104 to communicate with the NVM 110 of the data storage device 106 due to a shut down or disconnection of a link between the host device 104 and the controller 108. The listed non-operational link states are not intended to be limiting and may include other link states, such as the L1.1 and L1.2 link states. Furthermore, it is contemplated that more or less link states than the number of link states shown in the link state flow diagram 200 may be available and more or less low power link states may be applicable to the embodiments described herein.

Link states are numbered sequentially, where higher numbers represent lower power requirements due to a greater number of offline circuits and corresponding higher exit latencies. Furthermore, each link state has an associated power requirement and an exit latency. L0 and L0s may require 4.5 W with the lowest exit latency. L1 may require less power than L0, such as 3 W, and may have an exit latency equal to or higher than the exit latency of L0. L2 may require less power than L1 and may have an exit latency equal to or higher than the exit latency of L1. L3 may require less power than L2 and may have an exit latency equal to or higher than the exit latency of L2. The values for the link states and exit latencies are not intended to be limiting, but to provide an example of possible embodiments.

L0 is referred to as a fully operational state, where I/O commands are enabled, and the device may generate interrupts. L0 is a link state where the link is operating normally. Interrupts are an automatic transfer of firmware execution due to a system timer or a user command. Link states L0s and L1 are also operational states; however, L0s and L1 may have a lower functionality than that of L0. For example, L0s has a similar power requirement as that of the L0, but only allows for a serial link in one direction. The L0s state may be returned to the L0 state through link training and status state machine (LTSSM) L0s fast training sequences (FTS) sub-state. In the L0s link state, data may be transferred in one direction, but not the other. Thus, when a first device is coupled to a second device through a link, the first device may idle a transmitter of the first device independently and separately of the second device idling a transmitter of the second device, and/or vice-versa.

However, L1 allows for a bidirectional serial link and allows for a greater reduction in the power requirement, but has a higher exit latency than that of L0 and L0s. In the L1 link state, no data is being transferred so key portions of the PCIe transceiver logic may be turned off. Link states L2 and L3 are non-operational link states have a power requirement less than that of the operational link states. The difference between the L2 link state and the L3 link state is that auxiliary power has not been yet removed from the L2 link state. Furthermore, the memory devices of the NVM 110 that are not used are placed in a non-operational link state, L2 and L3, to limit the idle power consumption to a minimal value.

In order for I/O commands to occur, the link, such as a data bus, between the host device 104 and the controller 108 is woken up and placed into the L0 link state. The controller 108 changes the link state of the link between the host device 104 and the controller 108 from the operational link states, such as L0, L0s, or L1, to a different operational link state, such as L0, L0s, or L1, or to a non-operational link state, such as L2 or L3, depending on the situation. However, in order for the link to be placed into L2 or L3, the link will need to be in link state L2/L3 ready, which is a pseudo-state to prepare the component for a loss in power and reference clock(s). The arc between L2/L3 ready and L3 indicates the case where the platform does not provide or the device does not use Vaux. In this case, the L2/L3 ready state transition protocol results in a state of readiness for loss of main power and once main power is removed, the link settles into the L3 state. The controller 108 allocates the appropriate amount of power to return all link states L0s, L1, L2, L3 into link state L0 when a full operational state is required. For example, to return to L0 from L2 or L3, the link transitions to a transient pseudo-state, LDn, before transitioning to L0. The LDn state may be a fundamental reset state, a hot reset state, or a link disable transmission state by the upstream component (e.g., the host device 104). The LDn state involves the link being down. LDn is a transient pseudo-state to get back to L0 and is also entered through a fundamental reset, hot reset, or link disable transmission by an upstream component.

The link state L1, in some embodiments, includes additional sub-states, L1.1 and L1.2, where the link state L1 may be referred to as L1.0. The L1 sub-states (L1SS), L1.1 and L1.2, may require more power for operation than L2 and L3; however, the L1SS utilizes less power than the L1.0 state. At an L1SS, the link remains operational and requires less power to return to a more operational state, such as L1.0 or L0. Furthermore, the L1SS requires less time than the L2 and/or the L3 link states to return to a full active link state L0. The return from L1 to L0 is through the LTSSM recovery state.

FIG. 3 is table illustrating typical power state numbers according to one embodiment. The table presents the supported power states in SSD devices and the typical entry/exit latency and power consumption. In operational modes, the host device is able to send input/output (I/O) commands to the data storage device. When in non-operational modes, the host device is not able to send I/O commands immediately. There is a long exit latency before the host device is able to send the commands. As shown in FIG. 3, the entry latency is 1.5-3.5 mSec for non-operational power states.

More specifically, in the operational power states, the entry and exit latency is quite low. For PS0, PS1, and PS2, the entry latency and the exit latency is in the nanosecond range. PS0 utilizes the most power at approximately 3.5 W while PS1 operates at 75% of PS0 and PS2 operates at 50% of PS0. In the non-operational states of PS3, PS4, and PS5, the entry and exit latency is in the millisecond range, which on the entry latency side is 6 orders of magnitude difference, and 7 orders of magnitude difference on the exit latency side. The benefits of the non-operational state is in utilizing less power, but there is a latency cost.

In order to reduce exit latency, several possibilities have been proposed. One possibility is to place all internal databases in retention mode before entering a low power or non-operational mode so that when the data storage device wakes up, all information is restored immediately. The downside is that power consumption is too high and therefore irrelevant to deep low-power states such as the non-operational states.

Another possibility is to copy all internal databases and store all internal databases in an always-on memory before entering a low power or non-operational state. Compared to the first possibility, the power consumption is significantly reduced. However, the entry/exit time is higher compared to the first possibility due to the copy operations. In this possibility, all internal databases are recovered based on the information stored in always-on memory. The recovery process is done globally and equally to all resources without consideration of what is really needed. Hence, not only will there be a significant entry latency to be able to store all of internal databases, but there will be a significant exit latency because all of the stored internal databases need to be recovered.

A new possibility is discussed herein. A selective recovery method will have fast, low-power exit latency. While the previous approaches did not consider the number of used resources when entering and exiting the low power states, the selective recovery considers the resources. The data storage device controller selects the entry/exit low power state mode to be used when getting the low power transition request. The selection is based on the number of resources currently used by the host device. If the host device uses only a few of the resources, then it makes sense to utilize the selective recovery flow as the selective recovery flow will significantly shorten the low power exit latency as only part of the internal databases are recovered. If the selected mode is the selected recovery mode, the device controller prepares optimized firmware (FW) recovery codes that will be used in the exit flow. The code is optimized and only the needed information will be recovered instead of recovering the entire database. In the recovery flow, the optimized firmware code is used, and only selected entries of the internal databases are recovered while others are not.

The benefit of selective recovery is the very fast low-power exit flow. In some scenarios, the data storage device controller increases the low power entry latency in order to shorten the exit latency which is much more desired to the end user.

Figures 4A, 4B:
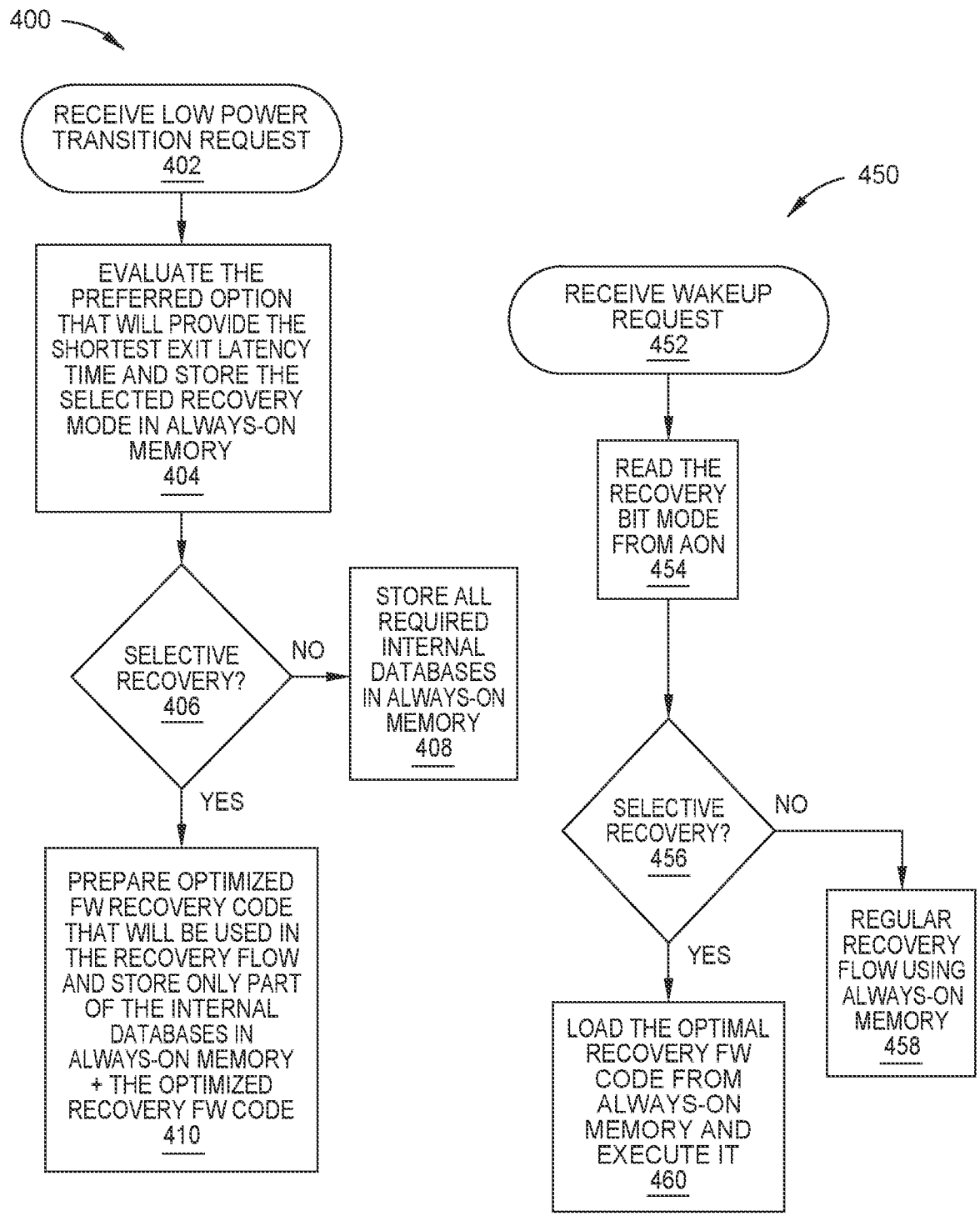
FIG. 4A is a flowchart illustrating a low-power entry method according to one embodiment.
FIG. 4B is a flowchart illustrating a low-power exit method according to one embodiment.

FIG. 4A is a flowchart 400 illustrating a low-power entry method according to one embodiment. The low power entry flow starts by receiving a request to transition to a low power state at 402. Based on the used resources, the data storage device decides whether to use the selective recovery flow or the normal non-selective recovery flow by evaluating the preferred option that will provide the shortest exit latency time and store the selected recovery mode in always-on memory at 404. The decision is based on the number of resources currently used by the host device. Some examples of those resources include the number of submission/completion queues and an MSI-X vector. If the host uses only a few of the resources, then the best decision is to utilize the selective recovery flow as the selective recovery flow will shorten significantly the low power exit latency as only part of the internal databases are recovered.

The decision is made at 406, and the decision may be made on a database by database basis such that one or more databases may have selective recovery while one or more other databases may not have selective recovery. If the selective recovery is not chosen, then any internal databases not selected for selective recovery are stored in always-on memory at 408, and when a wakeup request is received, the entirety of the databases will be recovered. Selective recovery is not chosen in situations where the number of used resources crosses a predefined threshold and the regular flow is more practical for implementation.

However, if selective recovery is chosen, then optimized FW recovery codes that will be used in the recovery flow are generated and only the portion of the database that will be needed is stored in always-on memory with the optimized recovery code at 410. Alternatively, rather than storing only the portion of the database that will be needed, the entire database can be stored with the portion that will be needed noted in the recovery code so that exit latency can be reduced. The recovery code is optimized and only needed information will be recovered instead of recovering everything.

It is to be understood that the selective recovery may encompass several embodiments. One embodiment involves storing the entire database and then recovering only the selected portions. Another embodiment involves storing only the selected portions that will be recovered. If a recovery code is present, then the controller knows that only selected portions are to be recovered, regardless of whether the entire database or the selected portion is stored in always-on memory. If no recovery code is present, the controller knows that the entire database is to be recovered from always-on memory. When the entire database is stored, together with a recovery code, the entry latency is increased due to the generation and storing of the recovery code. When only selected portions of the database are stored, together with the recovery code, the entry latency may be fairly close to the entry latency of storing the entire database without generating and storing a recovery code. It is also contemplated that when selected recovery is chosen and only selected portions of the database are stored in always-on memory, the recovery code will still be utilized even though the selected portions, which would encompass everything that was stored, will automatically be retrieved. The recovery code will still be utilized for providing the exact location of each portion that is needed in the recovery phase.

For the low-power entry method, it is to be understood that all data need not be treated identically. For example, it is contemplated that the controller may have two databases, database 1 and database 2. The host device may utilize only portions of database 1 and hence, database 1 is a good candidate for selective recovery. The host device may utilize all of database 2 (or exceed a predefined threshold of usage) and thus database 2 would not be a good candidate for selective recovery. When a low-power entry request is received, both database 1 and database 2 need to be stored in some fashion. Database 1 will be stored using selective recovery while database 2 will be stored in its entirety without using selective recovery. Hence, database 1 will have a recovery code and database 2 will not. The above example illustrates a situation where multiple databases can be treated differently for selective recovery determination. Stated another way, it is contemplated that selective recovery can be applied to databases on a database by database basis.

FIG. 4B is a flowchart 450 illustrating a low-power exit method according to one embodiment. The low-power exit flow begins upon receiving a wakeup request at 452. The recovery bit mode is read from always-on memory at 454. If the selective recovery mode is used at 456, then optimized recovery code is loaded and executed at 460. In selective recovery mode, less than the entire internal database is recovered in order to reduce latency of the exit flow. If selective recovery mode is not selected at 456, then regular recovery flow using always-on memory occurs at 458.

One example of selective recovery mode is NVMe queues and MSI-X tables. In most scenarios, the data storage device supports more resources of NVMe queues and MSI-X vector than what the host device really utilizes. The number of used resources is detected in the low-power entry flow. Based upon the information of the number of used resources, the device controller decides whether to activate the selective recovery flow or not.

FIG. 5 is a schematic illustration of a MSI-X table structure according to one embodiment. The MSI-X table is defined by the PCIe standard and contains several vectors while the size of each vector is 16 bytes. The typical size of the MSI-X table is 8 KB. However, the host device usually does not use the entire table, but rather, only small portions of the table. In the selective recovery mode, the device controller detects that only small portions of the table are used and restores only the used MSI-X vectors while ignoring the rest.

Figure 6:
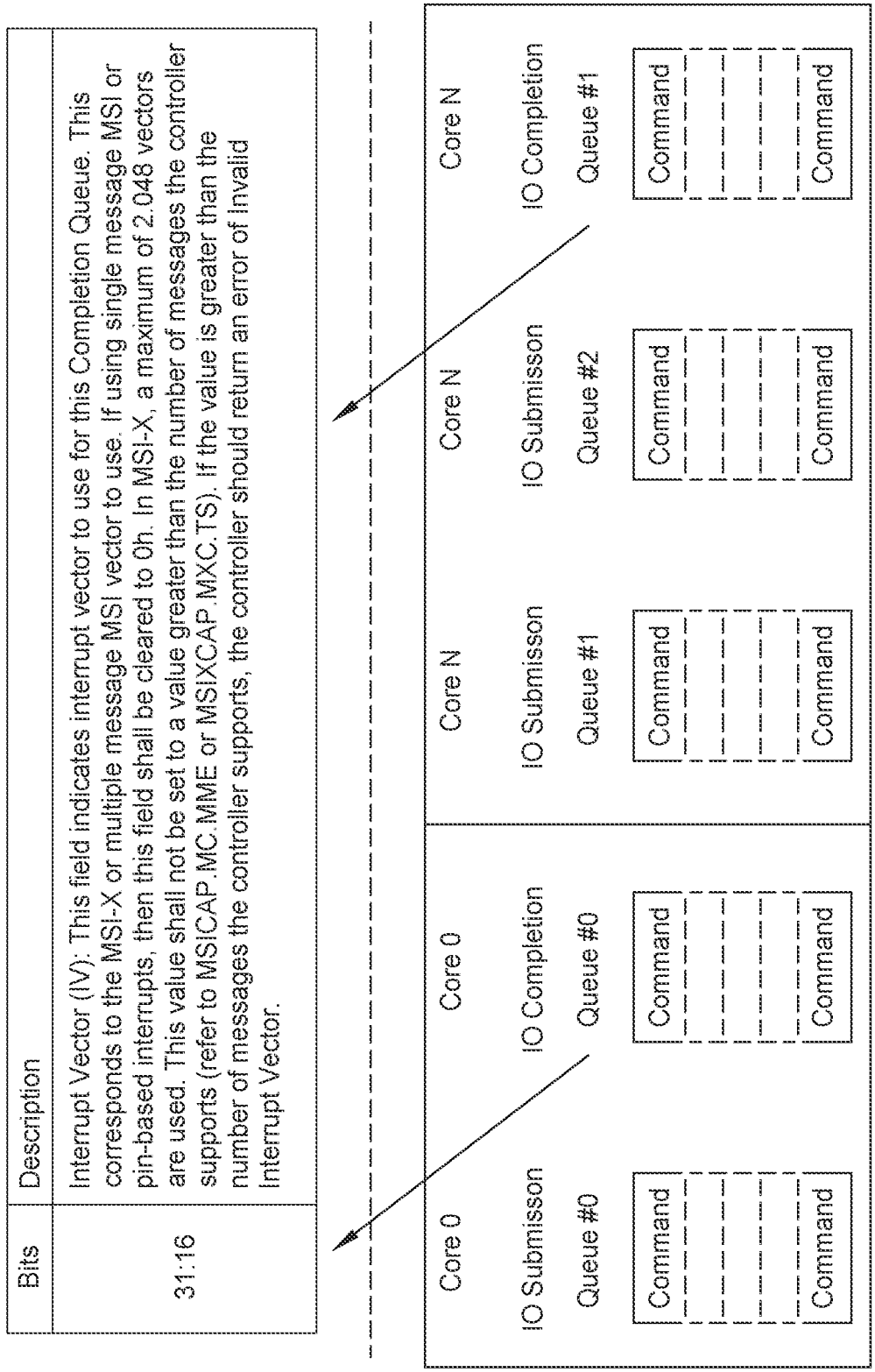
FIG. 6 is a schematic illustration of NVMe queues and MSI-X vector association according to one embodiment.

FIG. 6 is a schematic illustration of NVMe queues and MSI-X vector association according to one embodiment. In the example of FIG. 6, there are two host device cores. The first core utilizes one I/O submission queue and one I/O completion queue. The second core utilizes two I/O submission queues and one I/O completion queue. The host device associates an MSI-X vector with each completion queue using the IV field of the Create IO Completion Queue Admin command. When entering the low-power state, the device controller scans the completion queues and marks the used MSI-X vectors. The operation could be done even before getting the low-power transition request. Using this information of the used MSI-X vectors, the device controller may store and restore only the used MSI-X vectors rather than restoring everything. The main benefit of this operation is the very fast low-power exit flow. In one implementation, the same recovery mechanism is used in NVMe queues rather than MSI-X vectors such that rather than initializing all supported NVMe queues, only the NVMe queues that are utilized by the host are restored.

Figure 7:
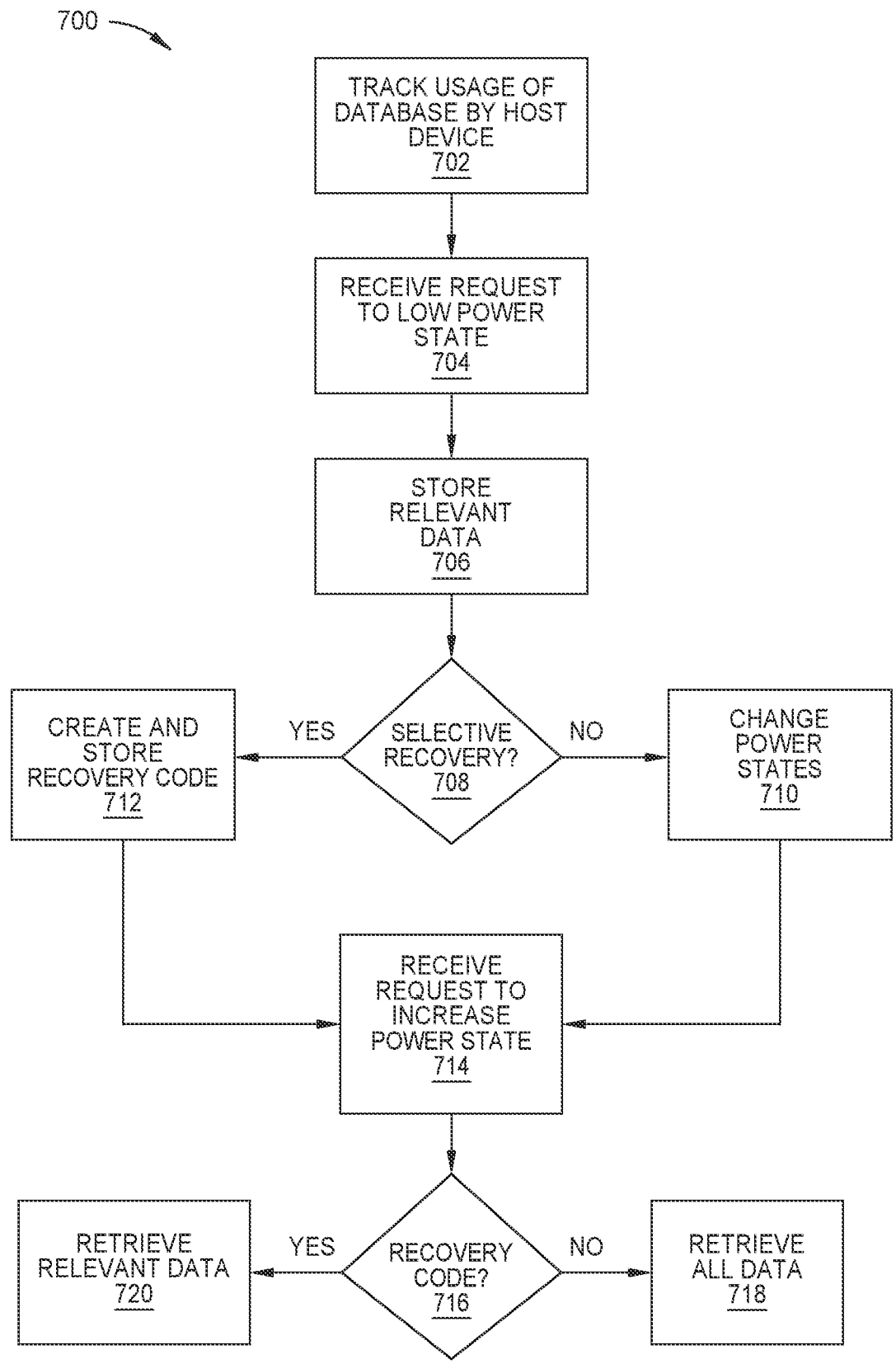
FIG. 7 is a flowchart illustrating a method of reducing exit time latency when transitioning from non-operational power states.

FIG. 7 is a flowchart illustrating a method 700 of reducing exit time latency when transitioning from non-operational power states. The method 700 begins tracking host device usage of all of the various tables and databases at 702. The various tables and databases are all stored in volatile memory that will either be lost or need to be flushed to non-volatile memory, always-on memory, or placed in retention mode. The tracking involves not only tracking which tables and databases are being accessed, but the particular area of the various databases and tables.

At 704, a request is received to transition the data storage device to a lower power state. At this point, the information tracked becomes important. The information indicates which data needs to be stored/preserved. The information stored can be all of the data or simply portions of the data. If only portions of the data is stored, the portions stored will be the portions accessed by the host device that were tracked at 702. At this point, the data is stored at 706 in always-on memory.

A determination is then made regarding whether selective recovery is possible at 708. The determination can be made at the database (or table) level. For example, an individual database, or table, can have only portions thereof that are accessed by the host device. Hence, the database or table is a perfect candidate for selective recovery. However, another database or table, while having only a portion of the table or database accessed by the host device, may not be a perfect candidate for selective recovery because the device access has exceeded a predetermined threshold of access. For example, if more than 60% of the database or table is accessed by the host device, then the database or table may be marked as unacceptable for selective recovery due to the fact that the threshold has been exceeded. It is to be understood that a 60% threshold is merely an example and that other thresholds are possible. Furthermore, rather than thresholds, it is also contemplated that one or more databases or tables may be specifically marked for storage in its entirety regardless of host access tracking and thresholds. Finally, it is to be understood that each database and/or table can be treated differently such that one or more databases or tables may be applicable for selective recovery while one or more other databases or tables are not suitable for selective recovery due to thresholds and/or specific marking.

If selective recovery is not an option, then the device is ready to change power states is recovered at 710. However, if selective recovery is an option, then a recovery code is generated and stored at 712 and the data storage device is then ready to change power states. Eventually, a request to increase the power state is received at 714. The data storage device then checks if there is a recovery code at 716. If there is no recovery code, then the entire database is retrieved at 718. If there is a recovery code, then the relevant data is retrieved at 720. If there is a recovery code, then recovering only the relevant data involves either retrieving all of the saved data or recovering only the relevant data that was saved. If recovering all of the saved data, the saved data will happens to be only the relevant data as only the relevant data was saved. If recovering only the relevant data, only the relevant portions needs to be retrieved even though all of the data was saved. The recovery code reduces latency on exiting a non-operational power state compared to recovering all data. Additionally, creating and storing a recovery code increases latency when entering a non-operational power state. Each database or table recovered may be treated differently such that one or more databases or tables has a recovery code while one or more other databases or tables does not have a recovery code.

By storing only a portion of data, rather than all of the data, in always-on memory, exit latency when transitioning from non-operational power states is reduced. The data stored in always-on memory is the data that has been accessed by a host device. Data that has not been accessed by the host device is not stored in always-on memory. In so doing, when transitioning back to an operational power state, the latency will be reduced compared to a situation where all data is stored in always-on memory. The capability of entering low power stats that consume minimum power with low exit latency is achieved. The exit latency parameter is more important than the entry latency parameter and hence, the selective recovery method reduces the exit latency while having a higher entry latency.

In one embodiment, a data storage device comprises: a memory device; and a controller coupled to the memory device, wherein the controller is configured to: receive a power transition request to transition the data storage device from a first power state to a second power state, wherein the second power state is a lower power state than the first power state, wherein at a time the request is received, data is stored in volatile memory; store at least a portion of the data in always-on memory in response to receiving the power transition request; generate and store a recovery code, wherein the recovery code indicates the portions of the data to be recovered; and transition the data storage device to the second power state. The controller is further configured to determine whether the data stored in volatile memory is suitable for selective recovery. The recovery code indicates that less than all of the data is stored in always-on memory. The controller is further configured to store the recovery code in always-on memory. The controller is further configured to monitor access to the data stored in volatile memory. The data comprises a first database and a second database, wherein at least a portion of the data comprises a portion of the first database and all of the second database. The data corresponding to the first database and the second database stored in always-on memory includes a recovery code. The at least a portion of data stored in always-on memory is less than all of the data. The controller is further configured to scan at least one completion queue of at least one host device. The controller is further configured to mark used MSI-X vectors of the at least one completion queues. The marking occurs prior to receiving the power transition request.

In another embodiment, a data storage device comprises: a memory device; and a controller coupled to the memory device, wherein the controller is configured to: receive a power transition request to transition the data storage device from a first power state to a second power state, wherein the second power state is a higher power state than the first power state; retrieve data stored in always-on memory, wherein the data stored in always-on memory is less than all data present in volatile memory prior to the data storage device entering the first power state; and transition the data storage device to the second power state. The controller is further configured to read a recovery bit is present in the always-on memory. The controller is further configured to determine whether selective recovery of the data is possible. The controller is configured to load a recovery code from always-on memory and execute the recovery code. The data corresponds to a portion of data from a first database, wherein the data corresponds to data accessed by a host device. The data additionally corresponds to all data from a second database.

In another embodiment, a data storage device comprises: memory means; and a controller coupled to the memory means, wherein the controller is configured to: create, store, and read a recovery code, wherein the recovery code indicates that less than all data present in volatile memory when the data storage device is in an operational power state is stored in always-on memory when the data storage device is in a non-operational power state. The controller is further configured to initialize less than all completion queues of a host device. The controller is further configured to: store data in volatile memory of the memory means; and store less than all of the data in always-on memory of the memory means upon receiving a request to change a power state of the data storage device.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
      receive a power transition request to transition the data storage device from a first power state to a second power state, wherein the second power state is a lower power state than the first power state, wherein at a time the request is received, data is stored in volatile memory;
store the data in always-on memory in response to receiving the power transition request;
generate and store a recovery code for specific data of the data, wherein the recovery code indicates portions of the data to be recovered, wherein the specific data is less than all of the data, wherein the less than all data is data for resources of the data storage device that were in use by a host device at a time of the receiving;
transition the data storage device to the second power state;
transition to the first power state;
detect the recovery code; and
retrieve the specific data without recovering data not identified in the recovery code.

2. The data storage device of claim 1, wherein the controller is further configured to determine whether the data stored in volatile memory is suitable for selective recovery.

3. The data storage device of claim 1, wherein the recovery code indicates that less than all of the data is stored in always-on memory.

4. The data storage device of claim 1, wherein the controller is further configured to store the recovery code in always-on memory.

5. The data storage device of claim 1, wherein the controller is further configured to monitor access to the data stored in volatile memory.

6. The data storage device of claim 1, wherein the data comprises a first database and a second database, wherein at least a portion of the data comprises a portion of the first database and all of the second database.

7. The data storage device of claim 6, wherein the data corresponding to the first database and the second database stored in always-on memory includes a recovery code.

8. The data storage device of claim 1, wherein the at least a portion of the data stored in always-on memory is less than all of the data.

9. The data storage device of claim 1, wherein the controller is further configured to scan at least one completion queue of at least one host device.

10. The data storage device of claim 9, wherein the controller is further configured to mark used vectors of the at least one completion queues.

11. The data storage device of claim 10, wherein the marking occurs prior to receiving the power transition request.

12. A data storage device, comprising:
a memory device; and
a controller coupled to the memory device, wherein the controller is configured to:
receive a power transition request to transition the data storage device from a first power state to a second power state, wherein the second power state is a higher power state than the first power state;
generate and store a recovery code for specific data of data, wherein the specific data is data for resources of the data storage device that were in use by a host device at a time of the receiving;
retrieve data stored in always-on memory, wherein the data stored in always-on memory is less than all data present in volatile memory prior to the data storage device entering the first power state;
transition the data storage device to the second power state;
transition to the first power state;
detect the recovery code; and
retrieve the specific data without recovering data not identified in the recovery code.

13. The data storage device of claim 12, wherein the controller is further configured to read a recovery bit is present in the always-on memory.

14. The data storage device of claim 13, wherein the controller is further configured to determine whether selective recovery of the data is possible.

15. The data storage device of claim 14, wherein the controller is configured to load a recovery code from always-on memory and execute the recovery code.

16. The data storage device of claim 12, wherein the data corresponds to a portion of data from a first database, wherein the data corresponds to data accessed by the host device.

17. The data storage device of claim 16, wherein the data additionally corresponds to all data from a second database.

18. A data storage device, comprising:
memory means; and
a controller coupled to the memory means, wherein the controller is configured to:
create, store, and read a recovery code for specific data, wherein the specific data is less than all of data stored, wherein the recovery code indicates that less than all data present in volatile memory when the data storage device is in an operational power state is stored in always-on memory when the data storage device is in a non-operational power state, wherein the specific data is data for resources of the data storage device that were in use by a host device at a time of receiving a request to power transition;
transition power states of the data storage device;
detect the recovery code; and
retrieve the specific data without recovering data not identified in the recovery code.

19. The data storage device of claim 18, wherein the controller is further configured to initialize less than all completion queues of the host device.

20. The data storage device of claim 18, wherein the controller is further configured to:
store data in volatile memory of the memory means; and
store less than all of the data in always-on memory of the memory means upon receiving a request to change a power state of the data storage device.

* * * * *